United States Patent
Ma et al.

(10) Patent No.: US 6,182,678 B1
(45) Date of Patent: Feb. 6, 2001

(54) APPARATUS FOR SAFELY INSTALLING AND REMOVING SPRING FAILSAFE ACTUATOR

(75) Inventors: Weijian Ma; Gabriel Silva, both of Liverpool, NY (US)

(73) Assignee: Young & Franklin, Inc., Liverpool, NY (US)

( * ) Notice: Under 35 U.S.C. 154(b), the term of this patent shall be extended for 0 days.

(21) Appl. No.: 09/442,516

(22) Filed: Nov. 18, 1999

(51) Int. Cl.[7] .............................. F16K 43/00; F16K 31/02
(52) U.S. Cl. .................................... 137/15.17; 137/15.18; 137/315.03; 137/315.27; 92/130 C; 251/63.6; 251/129.04; 251/129.11
(58) Field of Search .............................. 137/15.17, 15.18, 137/315.27, 315.03; 251/58, 62, 63.5, 63.6, 129.04, 129.11, 129.12, 129.13; 92/130 R, 130 C, 128

(56) References Cited

U.S. PATENT DOCUMENTS

| | | |
|---|---|---|
| Re. 30,115 * | 10/1979 | Herd et al. .......................... 251/63.6 |
| 1,087,337 | 2/1914 | Vogt . |
| 2,598,062 * | 5/1952 | Krecan ............................ 251/129.12 |
| 3,024,403 * | 3/1962 | Safford ............................ 251/129.12 |
| 3,086,745 * | 4/1963 | Natho .................................... 251/62 |
| 3,109,347 | 11/1963 | Brodl et al. ............................. 92/113 |
| 3,175,473 | 3/1965 | Boteler et al. ......................... 92/128 |
| 3,207,468 * | 9/1965 | Lauducci ................................ 251/58 |
| 3,379,405 * | 4/1968 | Natho .................................. 251/327 |
| 3,466,001 * | 9/1969 | Nelson ................................ 251/63.6 |
| 3,571,884 | 3/1971 | Chung ................................... 29/200 |
| 3,913,883 * | 10/1975 | Irwin ...................................... 251/25 |
| 4,213,480 * | 7/1980 | Orum et al. ......................... 137/556 |
| 4,261,546 * | 4/1981 | Cory et al. ............................. 251/58 |
| 4,423,748 * | 1/1984 | Ellett .................................... 137/315 |
| 4,436,279 * | 3/1984 | Bonds et al. ........................... 251/86 |
| 4,585,207 * | 4/1986 | Shelton ................................. 251/62 |
| 4,650,151 * | 3/1987 | McIntyre ............................... 251/14 |
| 4,651,970 * | 3/1987 | Sadler ................................. 251/63.6 |
| 4,671,312 * | 6/1987 | Bruton ................................ 137/315 |
| 4,744,386 * | 5/1988 | Frazer ................................ 137/315 |
| 4,809,733 * | 3/1989 | Hawkins ............................ 251/63.5 |
| 4,967,785 * | 11/1990 | Young ................................ 251/63.6 |
| 5,419,361 * | 5/1995 | Caudle et al. ...................... 251/63.5 |
| 6,041,804 * | 3/2000 | Chatufale ........................... 251/63.6 |

\* cited by examiner

*Primary Examiner*—George L. Walton
(74) *Attorney, Agent, or Firm*—Wall Marjama & Bilinski

(57) ABSTRACT

Apparatus for safely installing and removing spring loaded failsafe valve actuators. The apparatus includes a frame that retains a compression spring in a loaded condition between a cover plate fastened to the top wall of the frame and a spring seat slidably contained inside the frame. The spring seat is attached to the valve stem for moving reciprocally therewith between a closed and an open position. The stem is connected to the extendable rod of a remotely controlled actuator that is mounted in the cover plate and arranged to move the stem between the closed and open positions. In the event the actuator fails while the valve is in an open position, the compressed failsafe spring is released to rapidly close the valve.

12 Claims, 4 Drawing Sheets

US 6,182,678 B1

APPARATUS FOR SAFELY INSTALLING AND REMOVING SPRING FAILSAFE ACTUATOR

BACKGROUND OF THE INVENTION

This invention relates to a failsafe mechanism for rapidly returning a switch to an off position in the event the switch actuator fails when the switch is in an open position.

The term switch, as herein used, means any type of device that reciprocates between a first closed position and a second open position. An example of such a switch is a valve stem that closes the valve when in a first position and opens the valve when the stem is moved to a second position. Many valves are placed in generally inaccessible locations and are remotely positioned through a central control station. Electrically controlled linear actuators are typically connected to the stem of valves that operate to control the flow of fluids (liquid, gas or vapor) through the system. In the event of a power failure or a system failure, it is highly desirous to rapidly close all of the valves in the system to shut the system down and thus prevent damage from occurring. To this end, many spring loaded devices have been developed that act upon the valve to automatically close the valve when either the actuator fails or a shut down signal is sent to the actuator.

Although many of these spring equipped failsafe devices work well in practice, it has long been a problem to quickly and safely mount or dismount the device upon a valve because of the typically high spring forces involved. The inability to contain the spring in a compressed state can create a potentially dangerous situation.

SUMMARY OF THE INVENTION

It is an object of this invention to improve failsafe devices, and in particular, failsafe devices that are actuated by a spring that is mounted in a loaded condition against a switch to rapidly open or close the switch in the event of a system failure.

It is a further object of the subject invention to safely mount and dismount a compressed failsafe spring upon a switch.

A still further object of the present invention is to provide an improved spring loaded failsafe mechanism for use in association with a valve.

Yet a further object of the present invention is to safely install and remove a spring actuated failsafe actuator on a valve.

Another object of the present invention is to provide for ease of maintenance of a valve that is equipped with a spring loaded failsafe device.

Yet another object of the present invention is to lessen the down time required to maintain a valve equipped with a spring loaded failsafe device.

These and other objects of the present invention are attained by means of a failsafe device that includes a frame that contains a top end wall and a bottom end wall that are mounted in a spaced apart relationship by a plurality of columns. The stem of a linear function switch passes upward into the frame through the bottom end wall through a clearance hole provided in the end wall. The stem is movable over a reciprocal path of travel between a first closed position and a second fully opened position. A spring seat is attached to the stem for movement therewith and a compression spring is passed downwardly through the top wall of the frame into contact with the spring seat. A cover plate is placed over the top of the spring and is brought down in contact with the top end wall to compress the spring inside the frame and thus urge the stem into the closed position.

A linear actuator is mounted in the cover plate that contains a rod that is connected to the stem and is arranged upon demand to move the stem from the closed position to the open position wherein the spring is further compressed and to return the stem to the closed position. In the event the actuator fails, is shut down, or experiences a power failure while the stem is in an open position, the compress spring will take over to rapidly move the stem to a closed position.

BRIEF DESCRIPTION OF THE DRAWINGS

For a better understanding of these and other objects of the present invention, reference will be made to the following detailed description of the invention that is to be read in association with the accompanying drawings, wherein.

DESCRIPTION OF THE INVENTION

Although the present invention can be employed with any number of devices employing an on/off or modulating function switch, it is ideally suited for use in conjunction with a remotely controlled valve such as valves used in a power generation station or the like. Accordingly, the current invention will be described in conjunction with such a remotely controlled valve. In this type of environment, the valve might be rendered inactive while in an open position thereby posing a danger to the system being serviced and quite possibly to the valve itself.

Figure 1:
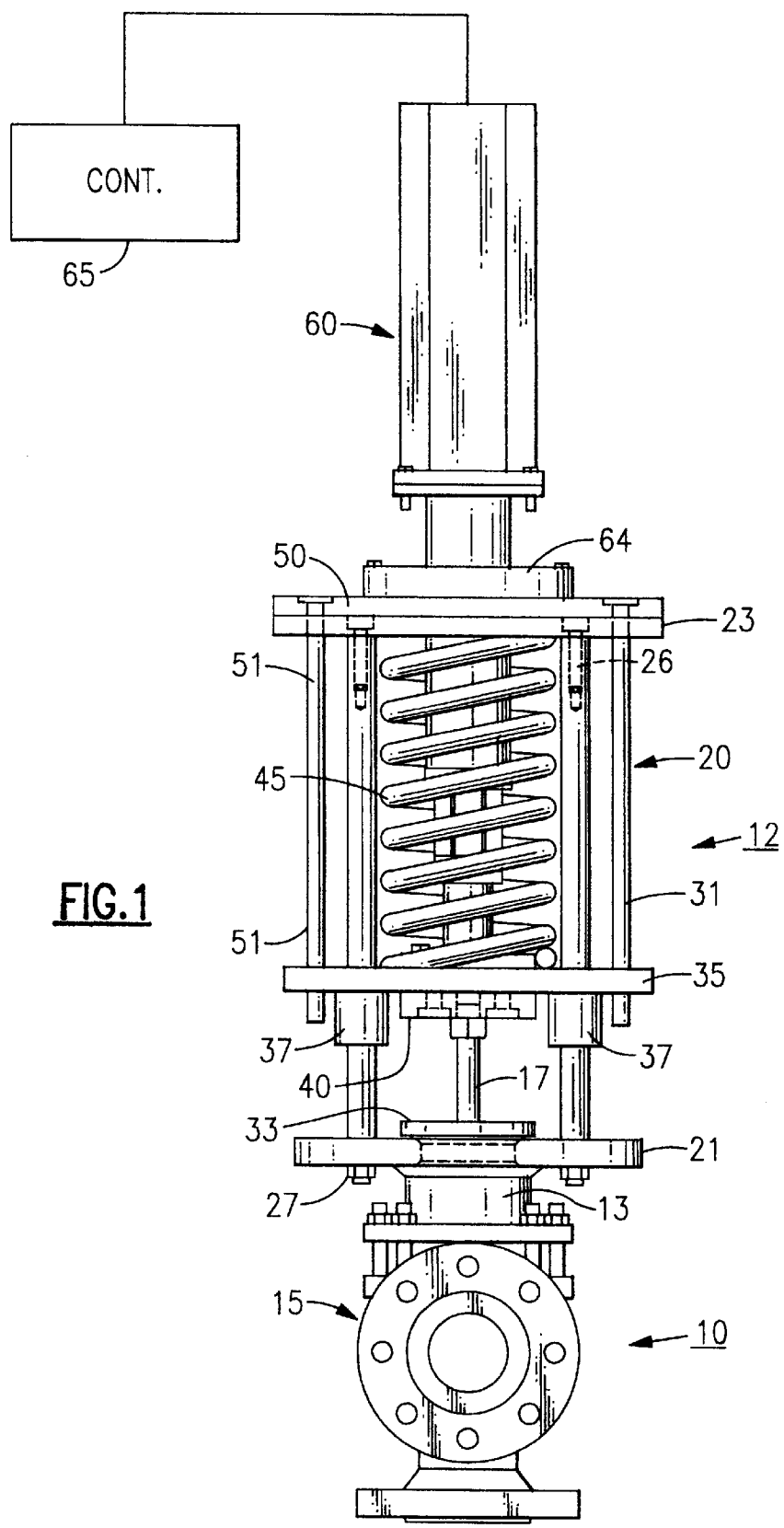
FIG. 1 is a front elevation of a valve that is equipped with a failsafe device embodying the teachings of the present invention.

Turning initially to FIG. 1 there is illustrated a valve, generally referenced 10, having a failsafe mechanism 12 mounted upon the top flange 13 of the valve body 15. The stem 17 of the valve passes upwardly through the top flange and operates in a conventional manner to lift the valve from the valve seat when the stem is raised, thereby opening the valve. The valve is correspondingly closed by returning the valve stem to its original home position.

Figure 2:
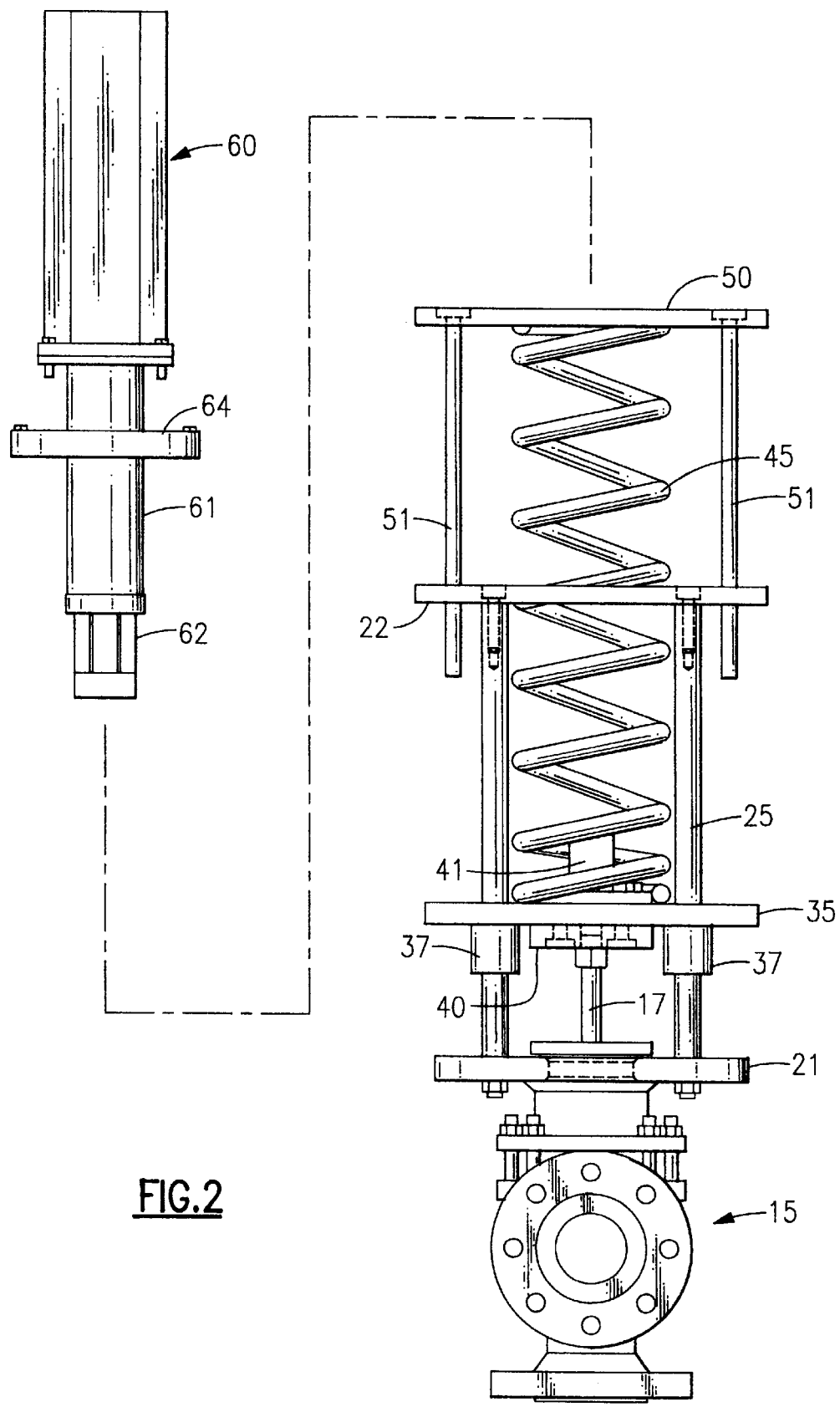
FIG. 2 is a front elevation showing the actuator drive separated from the frame and the top cover plate being released from the frame with the spring expanded to a non compressed state prior to assembly within the frame.
Figure 3:
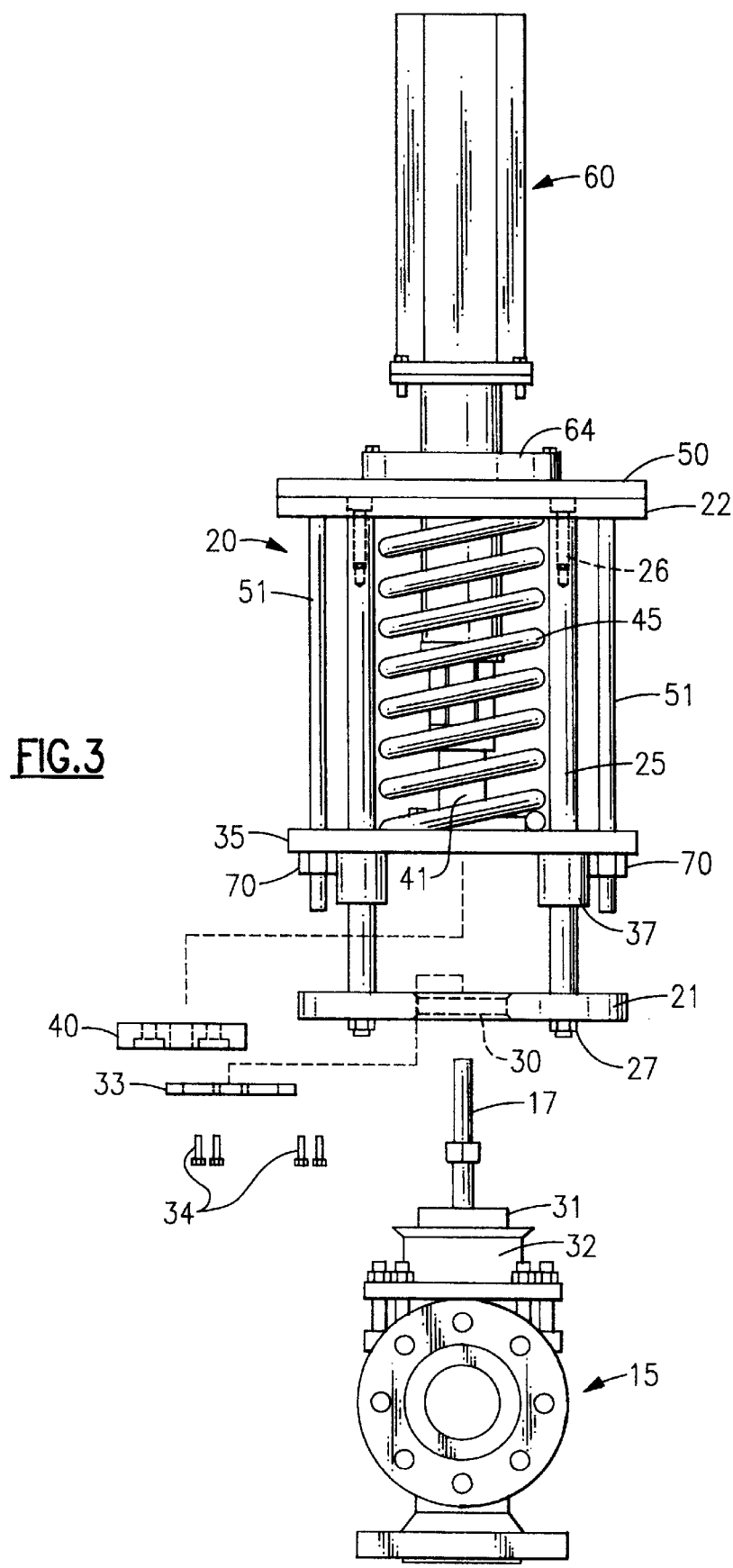
FIG. 3 is a front elevation of the valve shown in FIG. 1 with the spring frame of the failsafe mechanism shown removed from the valve as a unit and further showing the valve stem connector exploded away to one side.
Figure 4:
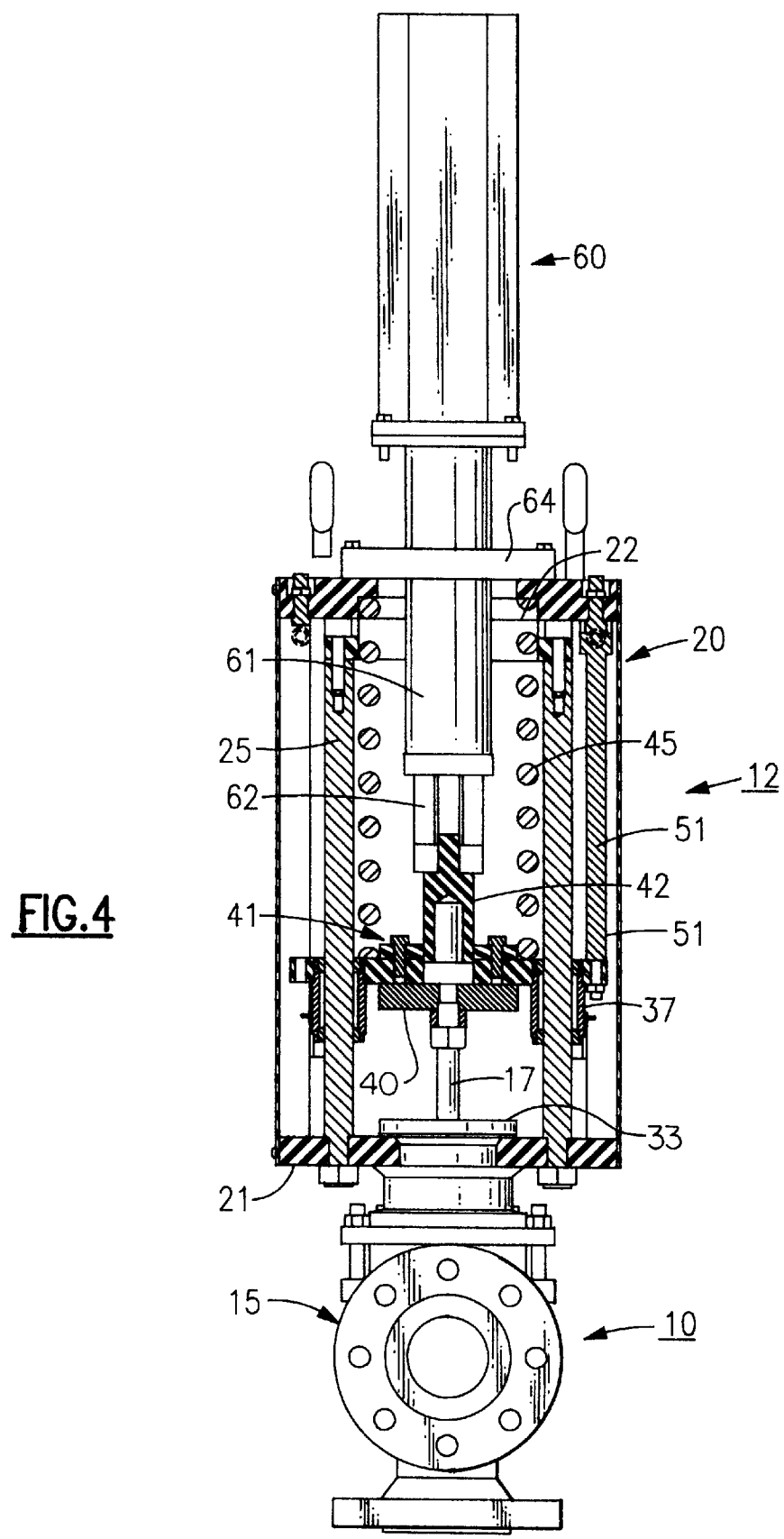
FIG. 4 is a front sectional view of the valve shown in FIG. 1 further illustrating the component parts of the failsafe spring mechanism.

As further illustrated in FIGS. 2–4, the failsafe mechanism includes an open frame 20 that contains a bottom end wall 21 and a spaced apart top end wall 22 that are held apart in a spaced relationship by a number of columns 25 that are secured to the end walls by threaded member 26 and 27. The bottom wall of the frame has a central hole 30 passing therethrough which is arranged to fit over raised cylinder 31 on the top flange 32 of the valve body. A connector 33 is then seated on top of the bottom end wall and is locked to the top flange of the valve body to support the frame in an upright position. The valve stem 17 passes upwardly through the bottom wall of the frame through the opening provided in the bottom wall so that the stem protrudes upwardly into the frame.

A spring seat 35 is slidably mounted upon the support columns 25 of the frame by means of bearing block 37. The spring seat, in turn, is connected to the extended end of the valve stem by means of an adaptor 40 that is fastened by screw 34 to the bottom of the spring seat and is secured to the stem by any suitable means. A connector 41 (FIG. 4) is secured to the top of the seat by bolts and contains a raised shank 42 that is centered along the axis of the valve stem.

As best illustrated in FIG. 2 a coil compression spring 45 is passed downwardly through a hole provided in the top wall of the frame. The lower or proximal end of the spring is placed in seating contact with the spring seat. A cover plate 50 containing a plurality of elongated downwardly directed bolts 51 is placed over the top or distal end of the spring. The cover plate at assembly is forced downwardly into contact with the top wall of the frame by driving the bolts 51 which compresses the spring and forces the spring seat down closing the valve. The elongated bolts 51 are brought through clearance holes in the spring seat and this cover is moved down until such time as the valve closes and the cover plate is tightly secured against the top wall of the frame.

A linear actuator 60 is also mounted in the frame. The actuator contains a cylindrical body 61 and an extendable rod 62 protruding from the lower section of the cylindrical body. The distal end of the rod is threaded onto the shank 42 of the connector 41 to adjustably couple the actuator to the spring seat. The actuator body contains a bolting flange 64 which, in assembly, is secured to the cover plate to hold the actuator in axial alignment with the valve stem. Although any type of actuator may be used in the practice of the present invention, the present actuator is a remotely controlled device that is connected to a remote controller 65. The actuator responds to electrical input signals to raise or lower the spring seat and thus open and close the valve. In the preferred embodiment of the invention, an electromechanical actuator is used to raise the spring seat to open the valve. It should be clear, however, that a motor, a solenoid, a hydraulic cylinder or the like may also be employed without departing from the teachings of the present invention. When the actuator is energized, the actuator raises the spring seat to open the valve. This raising of the seat further compresses the failsafe spring from its normal loaded condition. As long as the actuator remains energized, the valve will be held open against the biasing force of the spring. Deenergizing the actuator causes the spring to be released which, in turn, quickly closes the valve.

In assembly, the valve is held in a closed position under the influence of the compressed spring. To open the valve, the actuator is sent a control signal instructing it to draw the rod upwardly into the body of the actuator until the rod reaches a desired position dictated by the control signal. This, in turn, further compresses the failsafe spring causing the spring to create a high downwardly directed force upon the spring seat. The valve will remain open until such time as the actuator is instructed to lower the seat to the home or valve closing position. In the event of an actuator failure wherein the actuator can no longer function to hold the valve open, the tightly compressed spring will quickly take over and rapidly close the valve. Once the failsafe apparatus has been assembled and mounted upon the valve, it can be easily and safely removed as a unit in the event the valve must be inspected or periodic maintenance performed thereon. To remove the assembly, the stem adaptor need only be detached from the valve stem and the base plate freed from the valve body by removal of the connector. Initially, safety nuts 70 (FIG. 3) are threaded onto the distal ends of the elongated bolts 51 to hold the spring in a compressed or loaded condition inside the frame. As illustrated in FIG. 3, the entire frame assembly can now be lifted from the valve as a unit with the spring being maintained in a compressed state. The failsafe unit can be conventionally replaced upon the valve by securing the base plate to the valve body, connecting the valve stem to the spring seat and removing the safety nuts.

While this invention has been explained with reference to the structure disclosed herein, it is not confined to the details set forth and this invention is intended to cover any modifications and changes as may come within the scope of the following claims:

What is claimed is:

1. A fail safe apparatus that includes;
   a frame that contains a top end wall and a bottom end wall that are held in spaced apart relationship by a plurality of columns,
   a stem of a function switch that is reciprocally mounted to move between a first closed position and a second open position, said stem passing upwardly into the frame through said bottom end wall,
   a spring seat removably attached to said stem for movement therewith, said spring seat being slidably retained upon said columns for reciprocal movement along the length of said columns so that the stem can move between the first and second positions,
   a coil spring passing downwardly into said frame through an opening in the top end wall, the bottom of said spring resting in contact against the spring seat,
   a cover plate mounted on the top of said spring that is fastened to the top end wall of the frame to load said spring in compression against the spring seat whereby said stem is urged into the closed position;
   an actuator mounted upon the frame for moving the spring seat between the first closed position and the second open position to further compress said spring whereby the stem is rapidly returned to the closed position in the event the actuator fails when the valve is in an open position.

2. The apparatus of claim 1 that further includes locking means for securing the cover plate to the spring seat of said frame to hold the spring compressed within the frame.

3. The apparatus of claim 2 wherein said locking means includes a plurality of bolts that are slidably contained in the top end wall of the frame and the spring seat and threaded means removably retained on the ends of the bolts.

4. The apparatus of claim 2 that further includes an adaptor means for removably connecting said stem of said function switch to the spring seat.

5. The apparatus of claim 4 wherein said linear actuator is mounted upon said cover plate and further includes an extendable rod that is attached to said spring seat.

6. The apparatus of claim 1 wherein said function switch is a valve stem and which further includes a connector means removably securing the bottom wall of the frame to a valve body containing the valve stem.

7. The apparatus of claim 1 that further includes electrical control means connected to said actuator for controlling said actuator to move the function switch between a closed position and an open position.

8. A method of installing/removing a failsafe spring upon a reciprocating valve stem for a valve that includes the steps of
   supporting two end walls of a frame in spaced apart relation by a plurality of columns, slidably containing the distal end of a reciprocating valve stem in one end wall of said frame, removably attaching the distal end of the valve stem to a spring seat that is slidably contained within the frame along said columns so that said spring seat can move between a first position wherein the valve stem is in a valve closing position and a second position wherein said valve stem is in a valve opening position, passing a spring down through an opening in an opposite end wall of the frame so that the bottom of said spring contacts with said spring seat, placing a cover plate over the top of said spring and securing the cover plate to the said opposite end wall whereby the spring is compressed against the spring seat to urge the spring seat into a valve closing position, and attaching an actuator to the frame, said actuator further including an extendable rod that is removably connected to the spring seat.

9. The method of claim 8 that includes the further step of connecting the actuator to a control means wherein said actuator can be remotely controlled to move the spring seat to a position wherein the valve stem is placed in an open position and said spring is further compressed.

10. The method of claim 8 that includes the further step of mounting elongated bolts in said cover plate and slidably containing the shank of said bolts in said spring seat.

11. The method of claim 10 that includes the further step of placing threaded fasteners upon the ends of said bolts to lock the spring seat in a position to retain the spring within the frame in a compressed state and removing the valve stem from said spring seat whereby the frame and actuator can be removed from said valve stem as a unit.

12. The method of claim 8 wherein said valve stem further including the step of removably mounting the bottom end wall of the frame to a valve body.

* * * * *